United States Patent
Goder

(10) Patent No.: US 7,571,017 B2
(45) Date of Patent: Aug. 4, 2009

(54) INTELLIGENT DATA MULTIPLEXER

(75) Inventor: Alexey G. Goder, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1225 days.

(21) Appl. No.: 10/703,829

(22) Filed: Nov. 7, 2003

(65) Prior Publication Data

US 2005/0100058 A1 May 12, 2005

(51) Int. Cl.
*G06F 19/00* (2006.01)
*H04L 12/28* (2006.01)
*H04L 13/00* (2006.01)
*H04J 3/04* (2006.01)

(52) U.S. Cl. .............. 700/96; 700/2; 700/5; 700/9; 700/19; 700/121; 370/414; 370/479; 370/535; 370/537; 370/546; 370/908

(58) Field of Classification Search .............. 700/2–5, 700/9, 10, 19, 20, 96, 121, 196, 201; 370/535, 370/537–541, 546, 414, 479, 517, 908
See application file for complete search history.

(56) References Cited

U.S. PATENT DOCUMENTS

| | | | | | |
|---|---|---|---|---|---|
| 5,307,346 | A | * | 4/1994 | Fieldhouse | 370/254 |
| 5,721,946 | A | * | 2/1998 | Nagumo et al. | 710/4 |
| 5,768,119 | A | * | 6/1998 | Havekost et al. | 700/4 |
| 6,480,748 | B1 | * | 11/2002 | Gerszberg et al. | 700/21 |
| 6,842,660 | B2 | * | 1/2005 | Tripathi et al. | 700/121 |
| 7,031,793 | B1 | * | 4/2006 | Jenkins et al. | 700/121 |

* cited by examiner

*Primary Examiner*—Sean P Shechtman
(74) *Attorney, Agent, or Firm*—Tarek N. Fahmi

(57) ABSTRACT

An Intelligent Data Multiplexer ("IDM") can be used to interface a plurality of host computers with a semiconductor manufacturing tool. In one embodiment, the IDM has a plurality of host-side ports configured to receive messages from each of the host computers interfaced with the semiconductor manufacturing tool. The IDM also includes a multiplexer configured to multiplex the messages received from the host-side ports. To process possible conflict messages from the host computers, the IDM has a conflict resolve module. The messages are then delivered from the IDM to the semiconductor manufacturing tool through a tool-side port used to connect the semiconductor manufacturing tool to the IDM.

14 Claims, 6 Drawing Sheets

INTELLIGENT DATA MULTIPLEXER

FIELD OF THE INVENTION

The present invention relates to semiconductor manufacturing, and in particular, to interfacing multiple host computers with a semiconductor manufacturing tool.

BACKGROUND

Various semiconductor manufacturing tools are used in the semiconductor manufacturing process. Such tools include wafer steppers, lithographic equipment, etchers, ion implanters and other machines. A host computer can be interfaced with such a tool to provide commands to, or request and retrieve data from the tool. Various protocols, such as the SEMI Equipment Communications Standard protocol, have been developed to enable host/tool communication.

Host computers can be part of a communications network that is connected to a semiconductor manufacturing tool. As such, more than one host computer may wish to communicate with the tool. However, more than one host computer sending data request messages and other commands to the semiconductor manufacturing tool can result in conflicting messages that the tool may be unable to resolve. Furthermore, multiple host computers requesting data from the semiconductor manufacturing tool can also burden the processing and communications resources of the tool.

SUMMARY OF THE INVENTION

An Intelligent Data Multiplexer ("IDM") can be used to interface a plurality of host computers with a semiconductor manufacturing tool. In one embodiment, the IDM has a plurality of host-side ports configured to receive messages from each of the host computers interfaced with the semiconductor manufacturing tool. The IDM also includes a multiplexer configured to multiplex the messages received from the host-side ports. To process possible conflict messages from the host computers, the IDM has a conflict resolve module. The messages are then delivered from the IDM to the semiconductor manufacturing tool through a tool-side port used to connect the semiconductor manufacturing tool to the IDM.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1A:
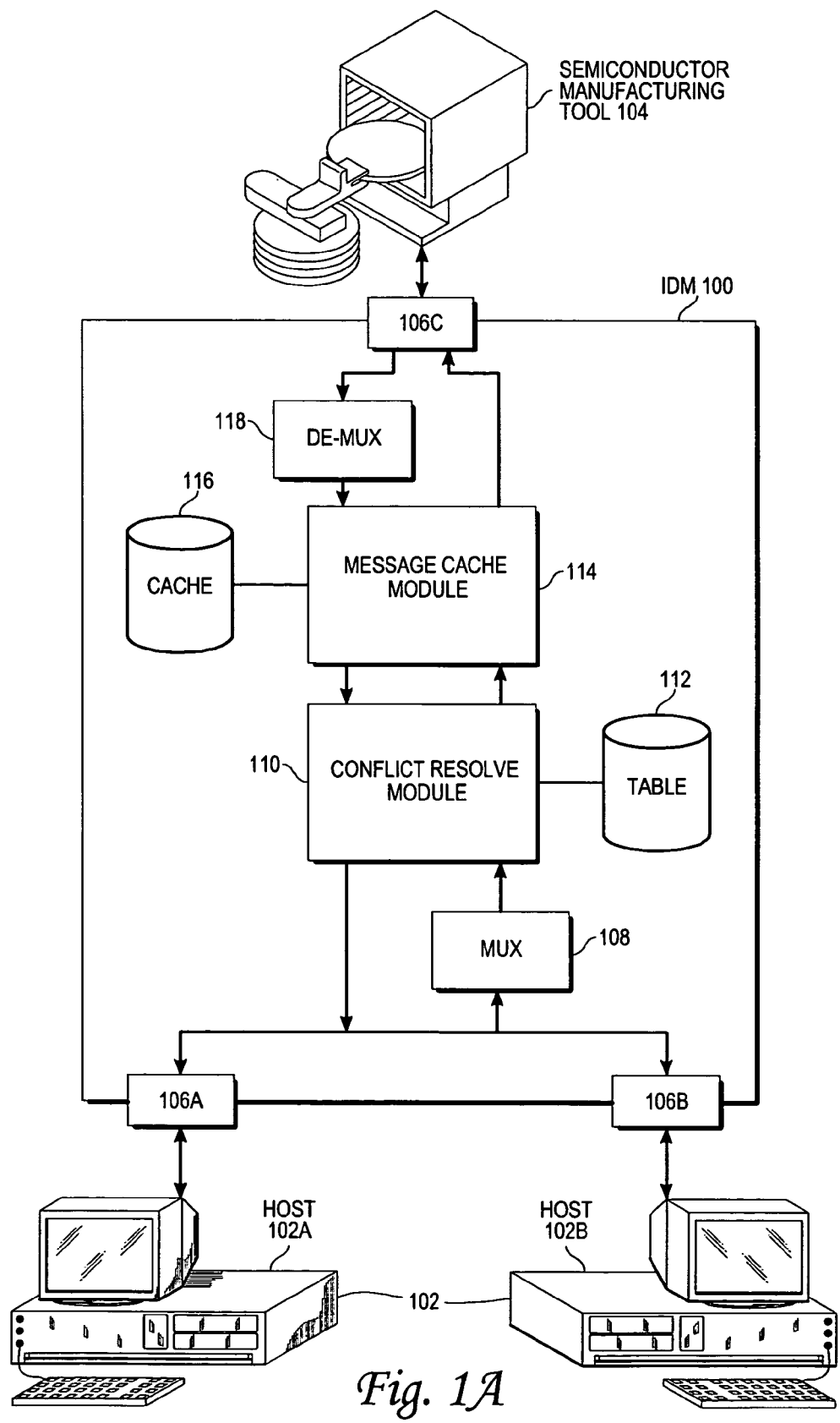
FIG. 1A is a block diagram illustrating an intelligent data multiplexer configured in accordance with one embodiment of the present invention.

Described herein is an intelligent data multiplexer to interface a semiconductor manufacturing tool with a plurality of host computers.

Although the present system will be discussed with reference to various illustrated examples, these examples should not be read to limit the broader spirit and scope of the present invention. For example, the examples presented herein describe distributed agents, managers and various network devices, which are but one embodiment of the present invention. The general concepts and reach of the present invention are much broader and may extend to any computer-based or network-based security system.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1A, one embodiment of an Intelligent Data Multiplexer ("IDM") 100 is illustrated. The IDM 100 is used to interface two host computers 102 (also referred to as "hosts")—labelled "host 102A" and "host 102B"—with a semi conductor manufacturing tool (also referred to as "tool") 104. The tool 104 can be any of the tools described above, among others, and the host computers 102 can include desktops. laptops. personal digital assistants ("PDA"), or any other computing devices. In the case of a mobile device, such as a PDA, the host 102 can be communicating wirelessly with the IDM 100. In one embodiment, the 1DM 100 resides in a server of a Local Area Network ("LAN"). The LAN provides communications and connectivity—both wireline and wireless—to the semiconductor manufacturing system, to which the hosts 102 and the tool 104 belong.

The host computers 102 can send messages, such as request messages and command messages, to the tool 100. The tool 104 can also send reply messages back to the hosts 102, for example to deliver a piece of data requested in a request message. Since there are more than one hosts 102, these messages are multiplexed by the IDM 100.

In one embodiment, the messages used for communication between the hosts 102 and the tool 104 are SEMI Equipment Communications Standard/Generic Equipment Model ("SECS/GEM") protocol messages. The SECS protocol describes the content of the messages, while GEM is an application-layer protocol that defines the messages themselves.

In one embodiment, host 102A accesses the IDM 100 using port 106A. Port 106A can be a logical port on the server that is the residence of the IDM 100. In this embodiment, port 106A and 106B—the port used by host 102B—are host-side ports, while port 106C enables the connection between the IDM 100 and the semiconductor manufacturing tool 104. In one embodiment, messages between the hosts 102 and the IDM 100 are exchanged using the High-Speed Message Services-Single Session ("HSMS-SS") protocol.

Messages received from the hosts 102 through the host-side ports are then multiplexed by a multiplexer 108. The multiplexer 108 can be implemented as a queue, or according to other well-known multiplexer algorithms. The messages of the message stream emerging from the multiplexer 108 have identifiers that identify what type of message it is according to a messaging protocol, such as the SECS protocol. However, since the messages are coming from two hosts 102, these identifiers may not be unique. For example, a trace request from host 102A will have the same identifier as a trace request from host 102B.

Such messages are herein referred to as "conflict messages," because they create a potential conflict in that the IDM 100 cannot tell from the message identifier to which host 102 the reply message should be delivered. Conflict messages are handled by the conflict resolve module 110 that accesses a message processing table 112. The operation of the conflict resolve module is described further below.

In one embodiment, data requested by a host 102 may already be stored in a cache 116. Such messages can be referred to as "caching messages." A message cache module 114 can handle caching messages according to one embodiment of the present invention. The operation of the message cache module 114 is described further below.

The semiconductor manufacturing tool 104 is connected to the IDM 100 through the tool-side port 106C. The reply messages from the tool 104 through port 106C are first de-multilexed by a de-multiplexer 118, and the message cache module 114 and the conflict resolve module 110 handle each reply message according to their respective operation. Finally, each reply message is then delivered through the proper port 106 to the host 102 that requested the data contained therein.

Figure 1B:
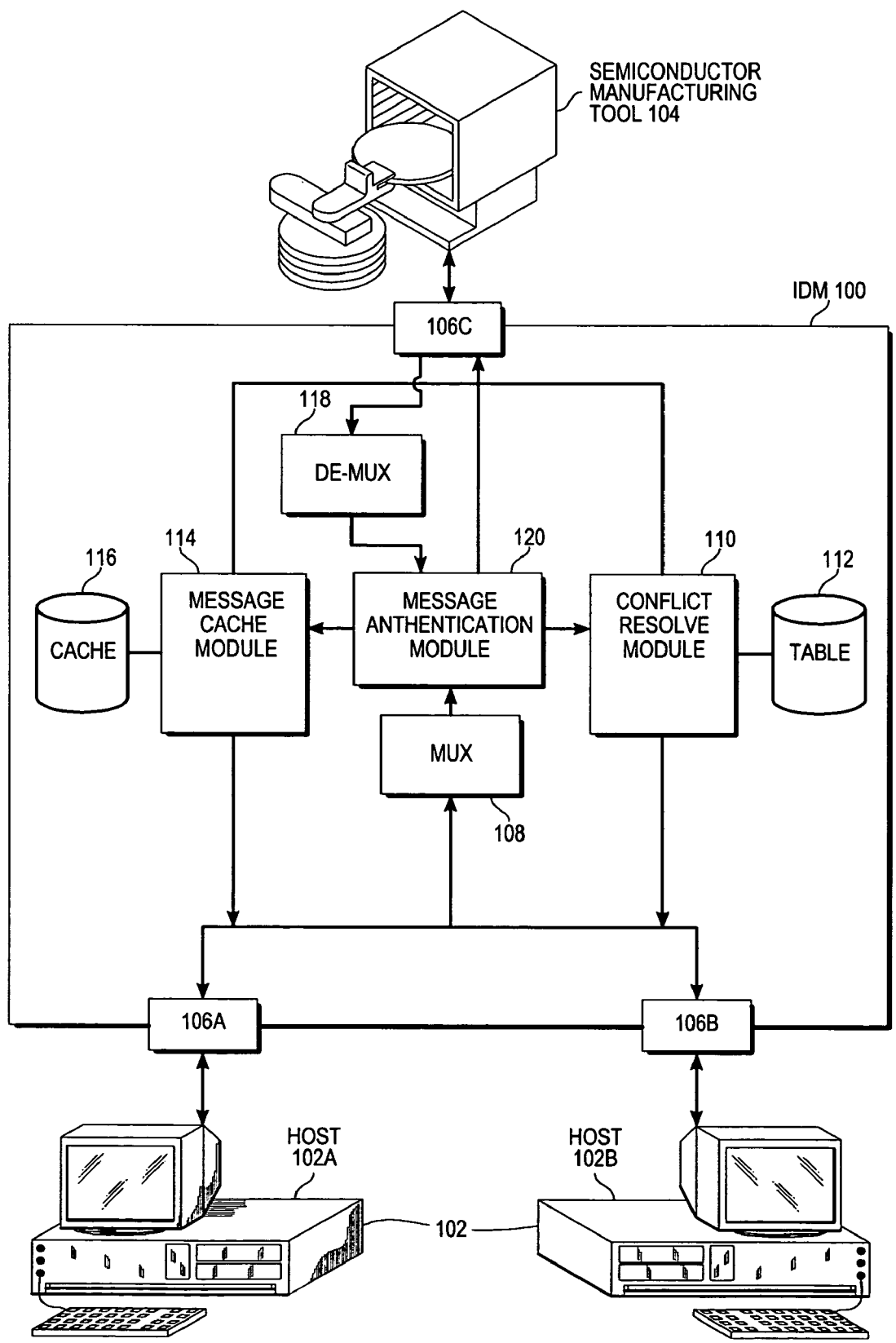
FIG. 1B is a block diagram illustrating an intelligent data multiplexer configured in accordance with another embodiment of the present invention.

The configuration illustrated in FIG. 1A is only one possible configuration for the IDM 100. Another embodiment is illustrated by FIG. 1B In this embodiment, messages are either conflict messages or caching messages, and a message authentication module 120 determines what type of message each received and reply message is. The message a authentication module 120 can perform other tasks as well, such as determining whether messages are supported, allowed, authorized, or should be passed straight through to the tool without further processing.

Figure 2A:
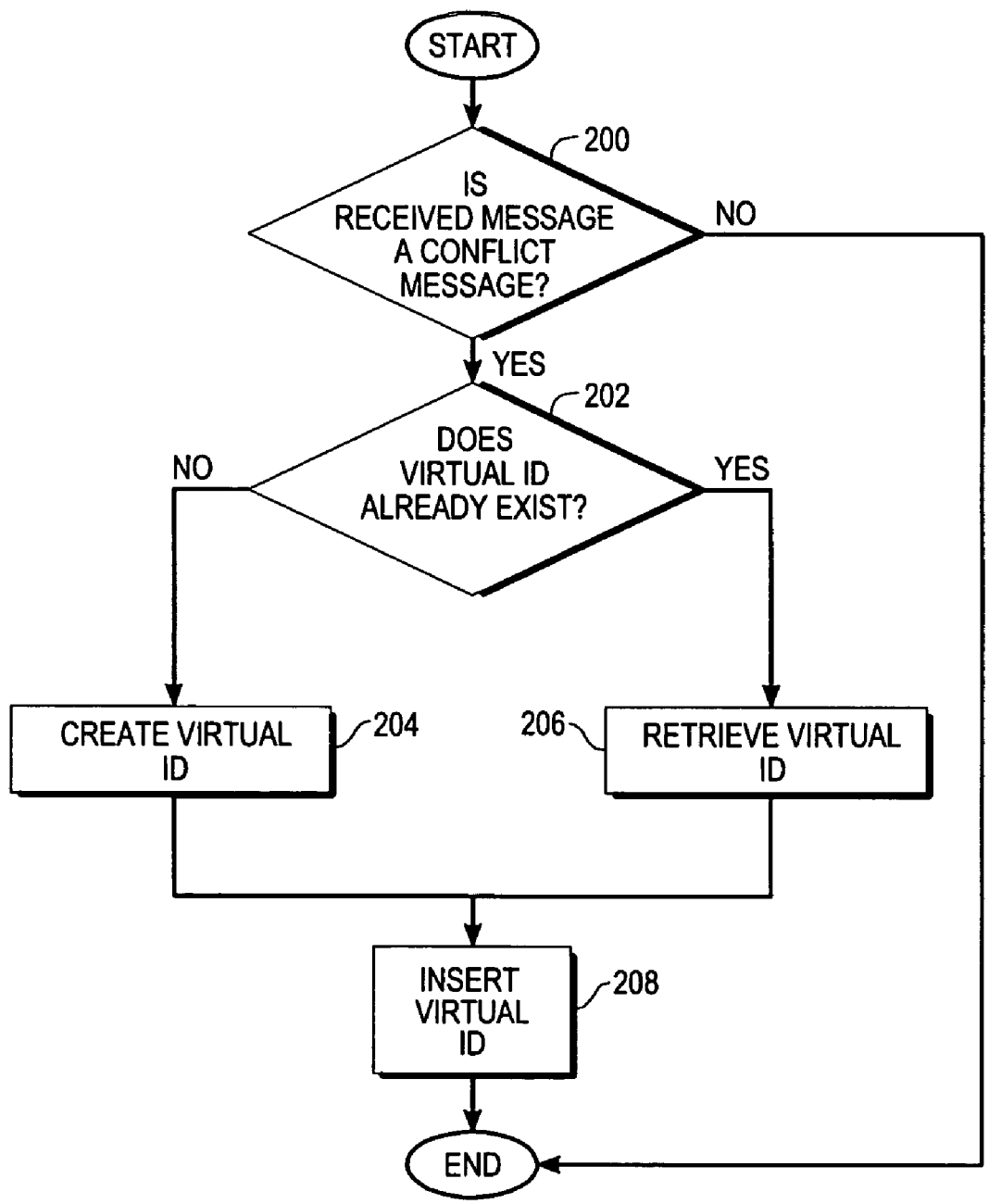
FIG. 2A is a flow diagram illustrating host-to-tool message processing by a conflict resolve module of an intelligent data multiplexer configured in accordance with one embodiment of the present invention.
Figure 2B:
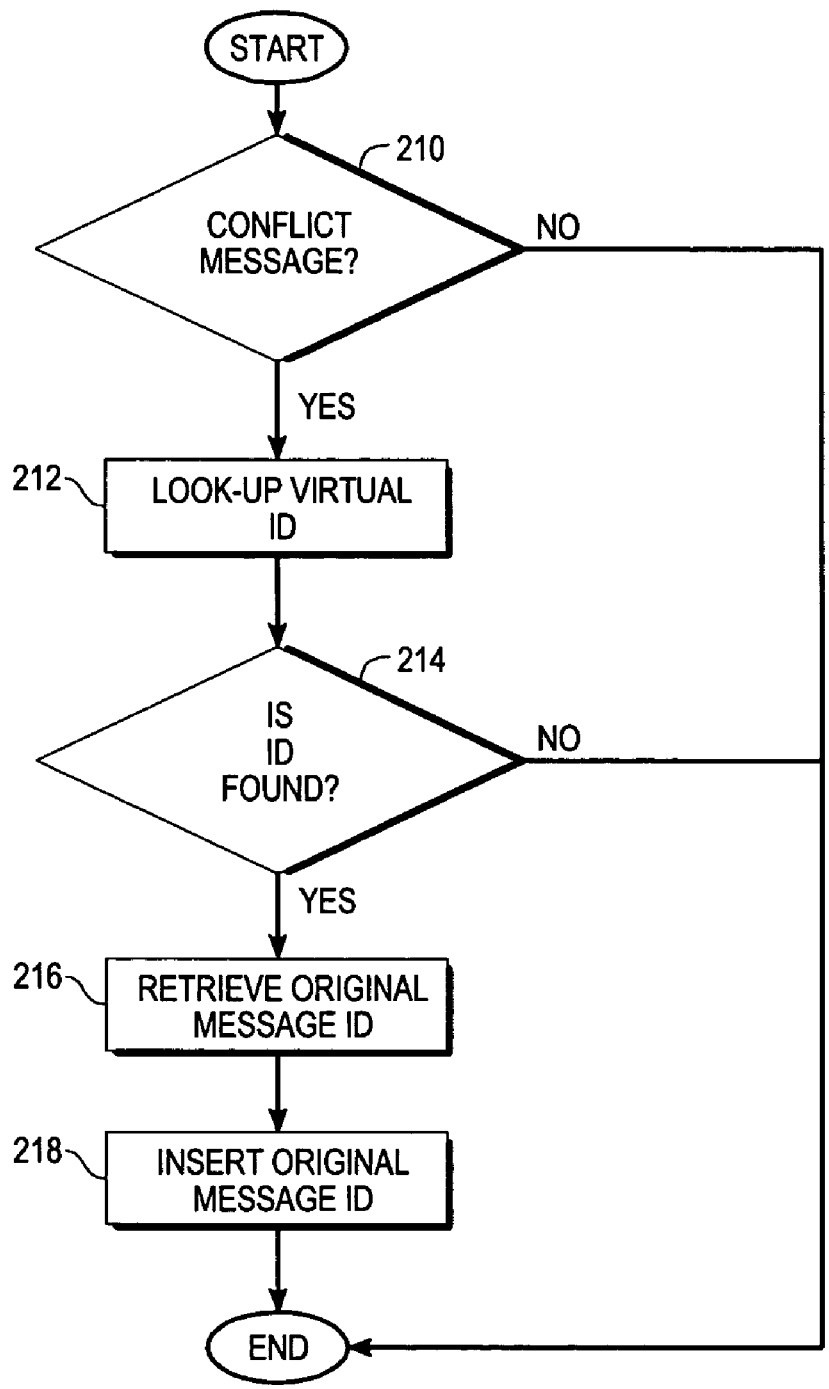
FIG. 2B is a flow diagram illustrating tool-to-host message processing by a conflict resolve module of an intelligent data multiplexer configured in accordance with one embodiment of the present invention.

Embodiments for the operation of the conflict resolve module 110 are now described with reference to FIG. 2A—describing host-to-tool processing—and FIG. 2B—describing tool-to-host processing. Host-to-tool message processing for one embodiment of the conflict resolve module 110 starts with receiving a message from one of the hosts 102, for example host 102A. In block 200, the conflict resolve module 110 determines whether the received message is a "conflict message," as defined above. If the received message is not a conflict message, the operation of the conflict resolve module 110 with respect to the present message terminates.

As mentioned above, in the embodiment described with reference to FIG. 1B, the determination described in block 200 is performed by the message authentication module 120. Whether a received message is a conflict message can be determined by accessing the message processing table 112 that can store a list of potential conflict message identifiers.

If the message received from host 102A is a potential conflict message, then, in block 202, the conflict resolve module 110 accesses the message processing table 112 to check whether a virtual identifier corresponding with the message identifier has already been created. If a virtual identifier has not been created, then, in block 204, the conflict resolve module 110 creates a virtual identifier.

In one embodiment, the virtual identifier is created by mapping the message identifier and a host identifier to some unique virtual identifier. The message identifiers are given by the messaging protocol. The host identifier can be anything that uniquely identifies the host 102 from which the received message originated. In one embodiment, the host identifier is the port number. Thus, for example, a message with identifier "11443" from host 102A using port 106A with port number "000011," the virtual identifier can be "11999," which then is stored in the message processing table 112 for future use. In one embodiment, the virtual identifier combines the information carried by the message and host identifiers to provide a unique namespace for all conflict messages.

If a virtual identifier already existed for this message, then, in block 206, it only needs to be retrieved from the message processing table 112. After the virtual identifier is either created or retrieved, it is inserted into the message in block 208 to replace to original message identifier. This completes host-to-tool message processing by the conflict resolve module 110 according to one embodiment of the present invention.

Tool-to-host message processing for one embodiment of the conflict resolve module 110 starts with receiving a reply message from the semiconductor manufacturing tool 104. In block 210, the conflict resolve module 110 determines whether the received message is a reply to a potential conflict message. If the reply message is not a conflict reply message, the operation of the conflict resolve module with respect to the present message terminates.

As mentioned above, in the embodiment described with reference to FIG. 1B, the determination described in block 210 is performed by the message authentication module 120. If the message received from the tool 104 is a potential conflict reply message, then, in block 212, the conflict resolve module 110 looks up the virtual identifier contained in the reply message in the message processing table 112. If such an identifier is not found, then the operation of the conflict resolve module 110 with respect to the present message terminates, since the identifier was not in fact a virtual identifier created by the conflict resolve module 110.

If the virtual identifier is found to exist, however, in block 216, the original message identifier associated with the virtual identifier is retrieved from the message processing table 112. Finally, in block 218, the original message identifier is inserted into the reply message to substitute for the virtual identifier. Thus, a non-unique conflict message is temporarily made unique by the conflict resolve module 110, before the reply is delivered back to the host 102 with the original message identifier. In this embodiment, the operation of the IDM 100 is transparent to the host computers 102.

Figure 3A:
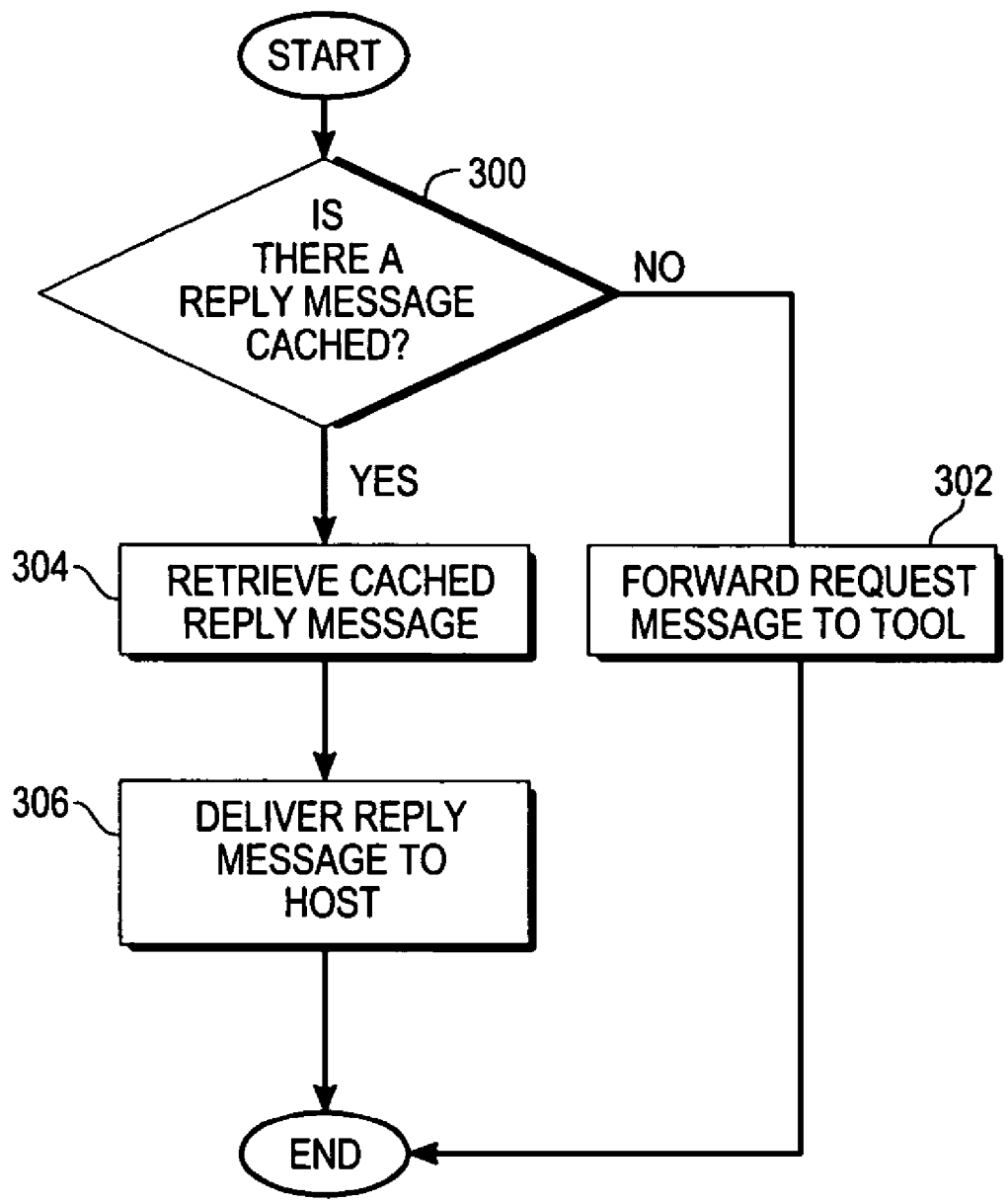
FIG. 3A is a flow diagram illustrating host-to-tool message processing by a message cache module of an intelligent data multiplexer configured in accordance with another embodiment of the present invention.
Figure 3B:
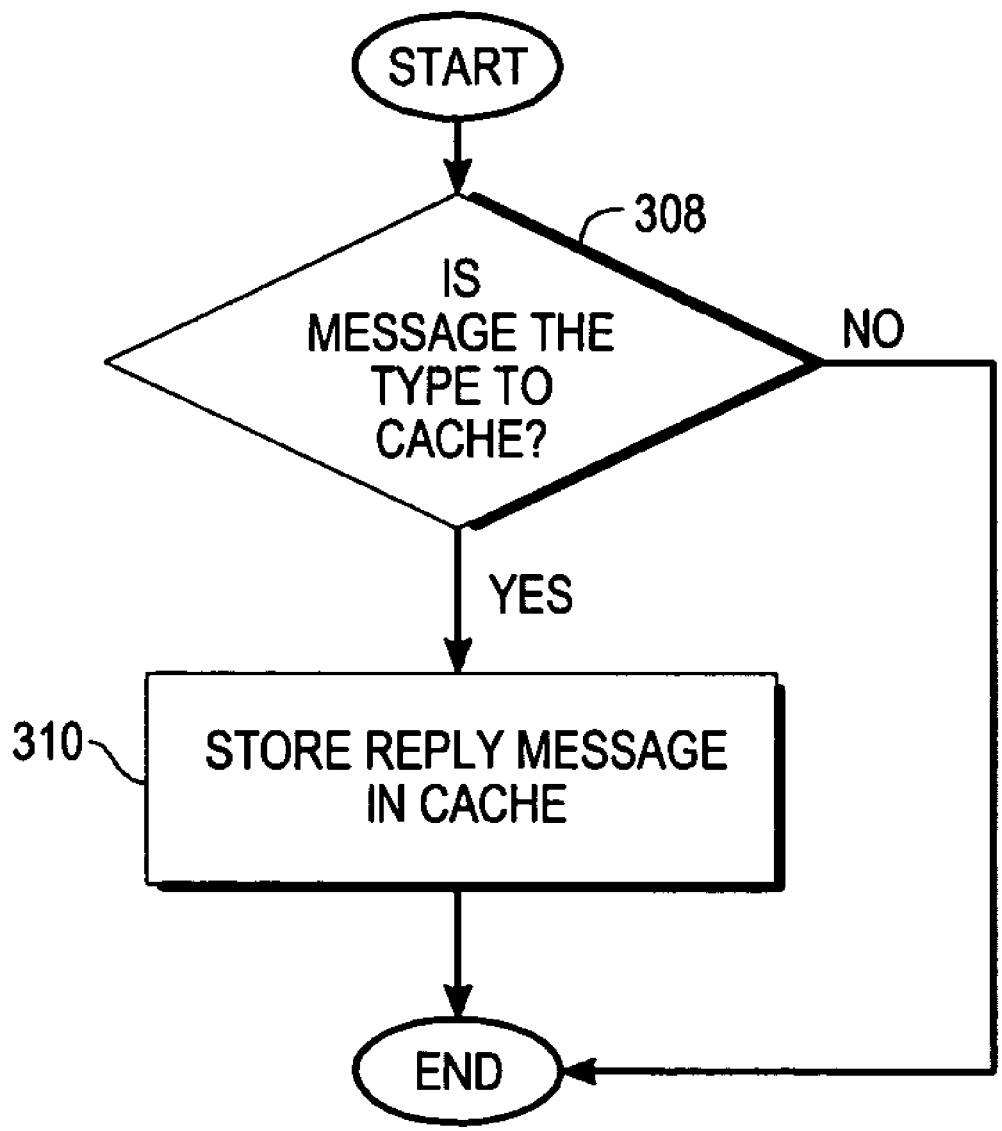
FIG. 3B is a flow diagram illustrating tool-to-host message processing by a message cache module of an intelligent data multiplexer configured in accordance with another embodiment of the present invention.

Embodiments for the operation of the message cache module 110 are now described with reference to FIG. 3A—describing host-to-tool processing—and FIG. 3B—describing tool-to-host processing. Host-to-tool message processing for one embodiment of the message cache module 114 starts with receiving a message from one of the hosts 102, for example host 102A.

In block 300, the message cache module 114 determines whether there is a reply to the received message already cached. This can be done by accessing the cache 116 and checking whether a reply by the tool 104 to a request for the same piece of data from host 102B is stored therein. In one embodiment, the cached reply message is only valid if it has been sent from the tool 104 within some maximum period of time. This time-out value can be configured by the customer.

If there is no valid cached reply to a corresponding request from a different host 102, then, in block 302, the received request message from host 102A is forwarded to the tool 104, and the operation of the message cache module 114 with respect to the present message terminates. If, however, a valid non-expired cached reply is found in the cache 116, then in block 304, the cached reply message is retrieved. The retrieved reply message can then be delivered, in block 306, to host 102A as a reply to its request without needing to query the tool 104. This completes host-to-tool message processing by the message cache module 114 according to one embodiment of the present invention.

Tool-to-host message processing for one embodiment of the message cache module 114 starts with receiving a reply message from the semiconductor manufacturing tool 104. In block 308, the message cache module 114 determines whether the received reply message is of a type usually cached. The list of such caching messages can be user configurable. If the reply message is not a caching message, the operation of the message cache module 114 with respect to the present message terminates.

As mentioned above, in the embodiment described with reference to FIG. 1B, the determination described in block 308 is performed by the message authentication module 120. If the message received from the tool 104 is of a type to be cached, then, in block 310, the reply message is stored in the cache 116.

In one embodiment, the reply message is timestamped according to receipt prior to storage. This can enable the expiration of the validity of the reply messages for one embodiment of the message cache module 114 described with reference to FIG. 3A.

Furthermore, storing the reply messages with a timestamp enables the message cache module 114 to be configured to replay the reply messages received from the tool 104, by simulating the timing of the reception of the reply messages. In this manner, the message cache module 114 can be used to recreate historic message exchanges for the purpose of training the IDM 100 or a host computer 102. Such message replay functionality can also be useful for the purpose of network performance monitoring.

In one embodiment, the IDM 100 car analyse request message patterns from the host computers 102. The results of such statistical analysis can then be used by the IDM 100 to query the tool 104 to obtain data about to be requested in anticipation of the actual request message by the host 102. The data can be stored in the cache 116, and its recovery can be performed by the regular operation of the message cache module 114described above.

Thus, an intelligent data multiplexer has been described. In the foregoing description, various data structures were given names, such as "message processing table," and various specific modules, such as the "conflict resolve module," have been described. However, these names are merely to describe and illustrate various aspects of the present invention, and in no way limit the scope of the present invention. Furthermore, various modules, such as the message cache module 114 and the conflict resolve module 110 in FIG. 1, can be implemented as software or hardware modules, or without dividing their functionalities into modules at all. The present invention is not limited to any modular architecture, whether described above or not.

In the foregoing description, the various examples and embodiments were meant to be illustrative of the present invention and not restrictive in terms of their scope. For example, FIG. 1 shows only two host computers, even though the number of host computers that can interface with the tool using the IDM can be significantly higher. Accordingly, the invention should be measured only in terms of the claims, which follow.

The invention claimed is:

1. An intelligent data multiplexer ("IDM") to interface a plurality of host computers with a semiconductor manufacturing tool, the IDM comprising: a plurality of host-side ports configured to receive messages from each host computer; a multiplexer configured to multiplex the messages received from the host-side ports; a conflict resolution module configured to process conflict messages from the multiplexed messages; a tool-side port configured to deliver the processed messages to the semiconductor manufacturing tool, and a message cache module configured to store reply messages from the semiconductor manufacturing tool, wherein the message cache module is configured to analyze received message patterns from the plurality of host computers and to speculatively request reply messages from the semiconductor manufacturing tool based on the analysis.

2. The IDM of claim 1, wherein the conflict resolution module processes conflict messages, in part, by creating a unique virtual identifier for each conflict message.

3. The IDM of claim 2, wherein the virtual identifier is based on the host-side port from which each conflict message is received.

4. The IDM of claim 2, wherein the conflict resolution module further processes conflict messages, in part, by substituting the virtual identifier for an original message identifier in each conflict message.

5. The IDM of claim 4, wherein the original message identifier is an SECS/GEM protocol identifier.

6. The IDM of claim 1, wherein the message cache module is further configured to: receive a message from one of the plurality of host computers; determine whether there is a valid reply message stored for the received message; and send the stored reply message to the host computer as a response to the received message.

7. The IDM of claim 6, wherein the IDM does not forward the received message to the semiconductor manufacturing tool.

8. The IDM of claim 1, wherein the message cache module further stores a timestamp associated with each reply message.

9. The IDM of claim 1, wherein the message cache module can be configured to replay reply messages from the semiconductor manufacturing tool.

10. The IDM of claim 1, wherein the plurality of host computers includes at least one mobile computing device.

11. A semiconductor manufacturing system comprising:
a semiconductor manufacturing tool;
a first host computer and a second host computer;
a server having resident thereon an intelligent data multiplexer ("IDM") to interface the first and second host computers with the semiconductor manufacturing tool, wherein the IDM comprises:
(a) a first port configured to receive messages from the first host computer;
(b) a second port configured to receive messages from the second host computer;
(c) a multiplexer configured to multiplex the messages received from the first port and the second port;
(d) a conflict resolution module configured to process conflict messages from the multiplexed messages;
(e) a third port configured to deliver the processed messages to the semiconductor manufacturing tool; and
(f) a message cache module configured to store reply messages from the semiconductor manufacturing tool wherein the message cache module is configured to analyze received message patterns from the plurality of host computers and to speculatively request reply messages from the semiconductor manufacturing tool based on the analysis.

12. The semiconductor manufacturing system of claim 11, further comprising a local area network ("LAN") to which the semiconductor manufacturing tool, the first and second host computers and the server are connected.

13. The semiconductor manufacturing system of claim 11, wherein the conflict resolution module processes conflict messages, in part, by creating a unique virtual identifier for each conflict message.

14. The semiconductor manufacturing system of claim 11, wherein the message cache module is further configured to: receive a message from the first host computer; determine whether there is a valid reply message stored for the received message, the reply message being a reply to a request from the second host computer at a prior time; and send the stored reply message to the first host computer as a response to the received message.

* * * * *